J. L. SUSSMAN.
TUBULAR STRUCTURE.
APPLICATION FILED MAY 21, 1921.
1,425,718.
Patented Aug. 15, 1922.
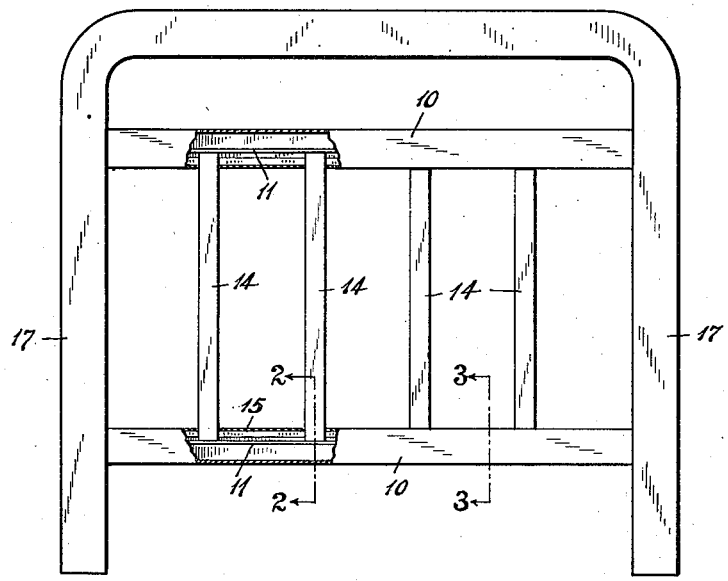
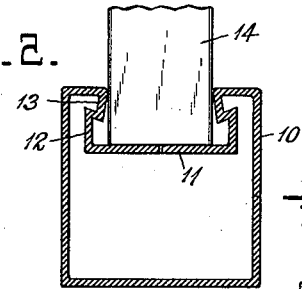
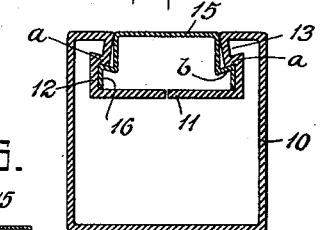
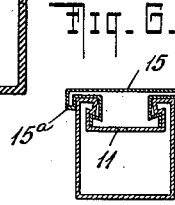
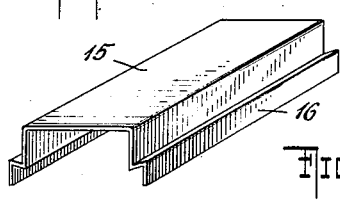
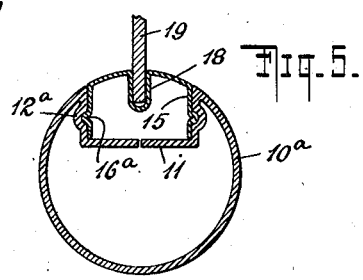
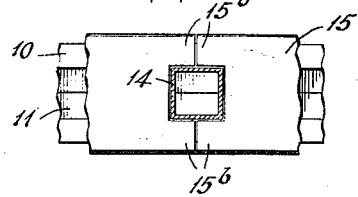
WITNESS
G. V. Rasmussen
INVENTOR
JULIUS L. SUSSMAN
BY
ATTORNEYS

UNITED STATES PATENT OFFICE.

JULIUS L. SUSSMAN, OF NEW YORK, N. Y.

TUBULAR STRUCTURE.

1,425,718.　　　　Specification of Letters Patent.　　Patented Aug. 15, 1922.

Application filed May 21, 1921. Serial No. 471,354.

*To all whom it may concern:*

Be it known that I, JULIUS L. SUSSMAN, a citizen of the United States, and resident of Kew Gardens, borough and county of Queens, city and State of New York, have invented certain new and useful Improvements in Tubular Structures, of which the following is a specification.

My invention relates to tubular structures as represented by metal bedsteads, railings and the like, and has for its object to provide a novel arrangement whereby such structures may be efficiently built up. Other more specific objects of the invention will appear from the description hereinafter and the features of novelty will be pointed out in the appended claims.

In the accompanying drawings, which illustrate an example of my invention without defining its limits, Figure 1 is an elevation of the head of a metallic bedstead constructed according to the invention, with parts broken away; Figure 2 is a section thereof on the line 2—2 of Fig. 1; Fig. 3 is a cross-section on the line 3—3 of Fig. 1 on an enlarged scale; Fig. 4 is a perspective view of a filler forming part of the invention, and Figs. 5, 6 and 7 are sectional views illustrating other forms of the invention.

For the purposes of illustration and description, I have chosen a bedstead to show the invention, it being understood that this is not in any sense to be construed as defining the limits of the invention and that the bedstead is to be considered as representative of structures in which kindred tubular members may be employed.

As shown in the drawings, main members or tubes 10 of any suitable cross-sectional form and of the desired dimensions are formed with lengthwise extending grooves 11, preferably undercut as indicated at 12, and provided with outwardly converging walls 13, as shown in Figs. 2 and 3. Auxiliary tubes 14 have their ends extending into said grooves 11, the parts being so proportioned that the tubes 14 will frictionally fit at least the opposite edges of said grooves and thus be fixed against unintentional withdrawal from said grooves; if desired, any type of mechanical fastening devices may be utilized as an additional means for fastening the auxiliary tubes in place or as a substitute for the frictional contact. The auxiliary tubes 14 are fixed in spaced relation to each other and against movement lengthwise of said grooves 11 by means of fillers or spacers 15; the latter are constructed of sheet metal of a shape corresponding to the shape of the grooves 11 and are provided with off-sets 16 arranged to fit into the undercut portions 12 of the grooves 11.

The fillers 15, because of their construction, have an inherent resiliency which tends to spread the off-sets 16 apart and which serves to snap the same into said undercut portions 12 and to maintain them therein, the co-operation of the transverse shoulders *a* and *b* of the undercut portions 12 and the off-sets 16 respectively preventing unintentional removal of the fillers 15 from the grooves 11; the shoulders *a* and *b* are preferably inclined with respect to the contiguous portions of the respective elements in order to lock the same against unintentional separation in an inward direction corresponding to a compression of the off-sets 16 toward each other. The fillers 15 are constructed to fit between and engage adjacent auxiliary tubes 14, the terminal fillers engaging at the outer ends the element with which the main tubes 10 are connected, these elements, in the example shown, being illustrated as the uprights 17 of the head-piece of a bed; the fillers 15 are furthermore preferably, though not necessarily, so dimensioned as to set flush with and carry out the surface contour of the main tubes 10, whatever this may be, the outer surface of the fillers in such case lying flush with the contiguous surface or surfaces of said main tubes, as shown in Figs. 3 and 5. In some cases, however, it may be desirable to construct and arrange the fillers as shown in Fig. 6 in which, instead of lying flush with the contiguous surface of main tubes 10, they overlap the same and thus, in addition to spacing the tubes 14 apart, serve also to completely conceal the presence of the grooves 11. In such form the fillers 15 may be further provided with edge flanges $15^a$ arranged to extend over the edges of the main tubes 10, as illustrated in Fig. 6, and with end tongues $15^b$ arranged to extend about the auxiliary tubes 14, as shown in Fig. 7; in some cases these tongues $15^b$ may be omitted.

In practice, the ends of the auxiliary tubes 14 are fitted into the grooves 11 of the main tubes 10 in the positions which they are to occupy in the particular design being produced, after which the fillers 15 are inserted or snapped into the grooves 11 between the adjacent auxiliary tubes 14 and between the terminal auxiliary tubes 14 and the uprights 17. The main tubes 10 may be fastened to the latter in any convenient manner, this connection being effected either after the auxiliary tubes have been fixed in place, as is now the case, or before said auxiliary tubes 14 have been connected with said main tubes; the latter simplifies the construction of the type of tubular structures in question and has heretofore not been possible. When combined, as described the presence of the grooves and the special construction of the main tubes is entirely concealed, the surface conformation of said main tubes being fully and completely carried out by the fillers 15 which, in addition, rigidly fix the auxiliary tubes 14 in the intended positions.

In some cases as, for instance, in certain types of metal bedsteads, particularly those which are constructed to simulate wooden beds, panels are included in the designs of the head and foot pieces. To provide for such constructions, the fillers 15 may be constructed with recesses 18, as shown in Fig. 5, into which the panels 19, in such case, are frictionally fitted. As shown also in Fig. 5, the undercut portions 12 of the grooves 11 and the off-sets 16 of the fillers may be constructed in the form of recesses 12$^a$ and projections 16$^a$ located respectively on the main tubes and fillers, as shown, or in reversed relation with respect to these elements. In this form, the main tube 10$^a$ is shown of circular cross-section instead of rectangular, as in the previous form, and the filler 15 is correspondingly shaped to carry out this surface contour. It will be understood that the illustrated cross-sectional shapes are merely illustrative and capable of any modification without in any way affecting the efficiency of the invention.

With the latter the necessity for drilling or otherwise providing holes in the main tubes for the reception of the auxiliary tubes which, because of the accuracy necessary to secure the desired result, is always a troublesome operation, is done away with and the connection of the auxiliary with the main tubes and the consequent building up of tubular structures of the type under discussion is reduced to the simplest operation which requires no skilled labor in its performance and thus materially reduces the cost of production. The fillers may be conveniently rolled in suitable sheet metal to provide reserve stocks and cut into the desired lengths, as required.

While the invention is particularly adapted for the construction of metal bedsteads it is equally well adapted for use in the construction of office and other railings and kindred structures and in such case provides a construction which is readily handled, fitted and assembled at the place of use. It will be obvious that the physical characteristics of the main members or tubes 10 and the grooves 11 may be different from those illustrated without in any way affecting the inventive idea.

Various changes in the specific forms shown and described may be made within the scope of the claims without departing from the spirit of my invention.

I claim:

1. The combination of a main member provided with a lengthwise extending groove, a plurality of auxiliary members having the ends extending into said groove and means fitted into said groove whereby said auxiliary members are spaced apart.

2. The combination of a main tube provided with an outwardly open groove extending lengthwise thereof, a plurality of auxiliary tubes spaced apart and having their ends fitted into said groove, a filler in said groove between and in engagement with adjacent auxiliary tubes whereby the latter are fixed in spaced relation and co-operating means on said main tube and filler whereby the latter is fixed in said groove against unintentional removal therefrom.

3. The combination of a main tube provided with an outwardly open groove extending lengthwise thereof, a plurality of auxiliary tubes spaced apart and having their ends fitted into said groove, a sheet-metal filler adapted to fit into said groove between and in engagement with adjacent auxiliary tubes whereby the latter are fixed in spaced relation and the surface contour of the main tube is carried out, said filler having an inherent resiliency tending to press it against the sides of said groove and co-operating means on said main tube and filler respectively whereby the latter is fixed in said groove against unintentional removal therefrom, said co-operating means being held in operative engagement by the resiliency of said filler.

4. The combination of a main tube provided with an outwardly open groove extending lengthwise thereof and having oppositely located, undercut portions, a plurality of auxiliary tubes spaced apart and having one end frictionally fitted in said groove, a sheet-metal filler adapted to fit into said grooves between and in engagement with adjacent auxiliary tubes whereby the latter are fixed in spaced relation and the surface contour of the main tube is carried out, and off-sets on said filler arranged to enter the undercut portions of the groove to maintain the filler therein against unintentional removal, said filler having an inherent resiliency whereby said off-sets are maintained in said undercut portions.

5. In an end piece for metal beds, the combination of a frame provided with legs, main tubes connected with said frame and provided with outwardly open grooves extending lengthwise thereof, auxiliary tubes spaced apart and having the ends fitted into the grooves of said main tubes and fillers fitted in said grooves between adjacent auxiliary tubes and between terminal auxiliary tubes and said frame whereby said auxiliary tubes are fixed in position.

6. The combination of a tube having an outwardly open groove extending lengthwise thereof and fillers fitted into said groove to carry out the surface contour of said tube and having their ends spaced apart to provide recesses at intervals along said tube.

7. The combination of a main member having an outwardly open groove extending lengthwise thereof, and fillers fitted into said groove and having their ends spaced apart to provide recesses at intervals along said main member.

In testimony whereof I have hereunto set my hand.

JULIUS L. SUSSMAN.